(12) United States Patent  
Wang et al.

(10) Patent No.: US 8,702,364 B2
(45) Date of Patent: Apr. 22, 2014

(54) SCREW FASTENER

(75) Inventors: Mingang Wang, Shenzhen (CN); Lei Liu, Shenzhen (CN)

(73) Assignee: Yimingda Exactitude Technology Co., Ltd., Shenzhen (CN)

( * ) Notice: Subject to any disclaimer, the term of this patent is extended or adjusted under 35 U.S.C. 154(b) by 80 days.

(21) Appl. No.: 13/241,201

(22) Filed: Sep. 22, 2011

(65) Prior Publication Data

US 2012/0251266 A1  Oct. 4, 2012

(30) Foreign Application Priority Data

Apr. 1, 2011  (CN) .................... 2011 2 0092670 U

(51) Int. Cl.
*F16B 33/00* (2006.01)

(52) U.S. Cl.
USPC ............................ 411/368; 411/134; 411/408

(58) Field of Classification Search
USPC ......... 411/103, 121, 133, 134, 136, 147, 150, 411/182, 402, 408, 368, 107, 366.1
See application file for complete search history.

(56) References Cited

U.S. PATENT DOCUMENTS

| 3,426,819 | A | * | 2/1969 | Estes et al. | 411/360 |
| 4,361,997 | A | * | 12/1982 | DeCaro | 52/512 |
| 4,630,984 | A | * | 12/1986 | Reinwall et al. | 411/368 |
| 4,952,107 | A | * | 8/1990 | Dupree | 411/103 |
| 5,094,579 | A | * | 3/1992 | Johnson | 411/107 |
| 5,454,676 | A | * | 10/1995 | Conte | 411/339 |
| 5,853,442 | A | * | 12/1998 | Glen et al. | 55/378 |
| 6,074,146 | A | * | 6/2000 | Soemer | 411/353 |
| 7,552,902 | B2 | * | 6/2009 | Tsuge | 248/638 |
| 7,661,916 | B2 | * | 2/2010 | Downey | 411/354 |
| 2010/0232908 | A1 | * | 9/2010 | Chiu | 411/554 |

* cited by examiner

*Primary Examiner* — Gary Estremsky
(74) *Attorney, Agent, or Firm* — Dresch IP Law, PLLC; John J. Dresch

(57) ABSTRACT

A screw fastener, for fastening a workpiece to a fixed member, including a screw having a head having circumferential knurling and a stem having a first stem portion abutting the head and second stem portion abutting the first stem portion, the first stem portion having a smooth surface and the second stem portion having threads; a fixed member having a countersink bore section for accommodating the head and a threaded bore section for engagement with the second stem portion, the countersink bore section having a larger diameter than the threaded section; and a plastic washer having a hole that allows the washer to engage with the threaded section and an outer diameter larger than the diameter of the bore; the second stem portion passing sequentially through the workpiece to be fastened, the plastic washer, the countersink bore section and engage with the threaded bore section of the fixed member.

7 Claims, 3 Drawing Sheets

SCREW FASTENER

FIELD OF THE INVENTION

The invention is related to a fastener, and particularly relates to a screw fastener with an improved fastening structure.

BACKGROUND OF THE INVENTION

In the current art, screws have to be operated with a screw driver for engagement with and detachment from a workpiece and/or a nut. Moreover, the screw may drop and get lost since the screws are normally being detached completely from the workpiece.

SUMMARY OF THE INVENTION

An object of the invention is to provide an improved screw fastener which can be operated without the use of a dedicated device, such as a screw driver, and can avoid the loss of the screw after detachment from the nut.

According to one aspect of the invention, an improved screw fastener for fastening a workpiece to a fixed member is provided which comprises a screw having a head and a stem wherein the head is circumferentially provided with knurling and the stem is provided with a first stem portion abutting the head and a second stem portion abutting the first stem portion, the first stem portion is provided with a smooth surface whereas the second stem portion is provided with threads; a fixed member having a countersink bore section for accommodating the head and a threaded bore section for engagement with the second stem portion, wherein the countersink bore section having a diameter larger than the diameter of the threaded section; and a plastic washer having a hole in a diameter that allows the washer to engage with the threaded section and an outer diameter larger than the diameter of the bore; wherein the second stem portion passes sequentially through the workpiece to be fastened, the plastic washer, and the countersink bore section, and engage with the threaded bore section of the fixed member.

Preferably, the knurling is straight knurling, hatching knurling or tooth-shaped knurling.

The improved screw fastener in this application is advantageous in that a user can fasten or loosen the screw into the nut only by hand and without use of any device such as a screw driver; moreover, by providing the plastic washer, the configuration of the stem and the countersink bore and threaded portion of the fixed member.

DETAILED DESCRIPTION OF THE EXEMPLARY EMBODIMENTS OF THE INVENTION

Figure 1:
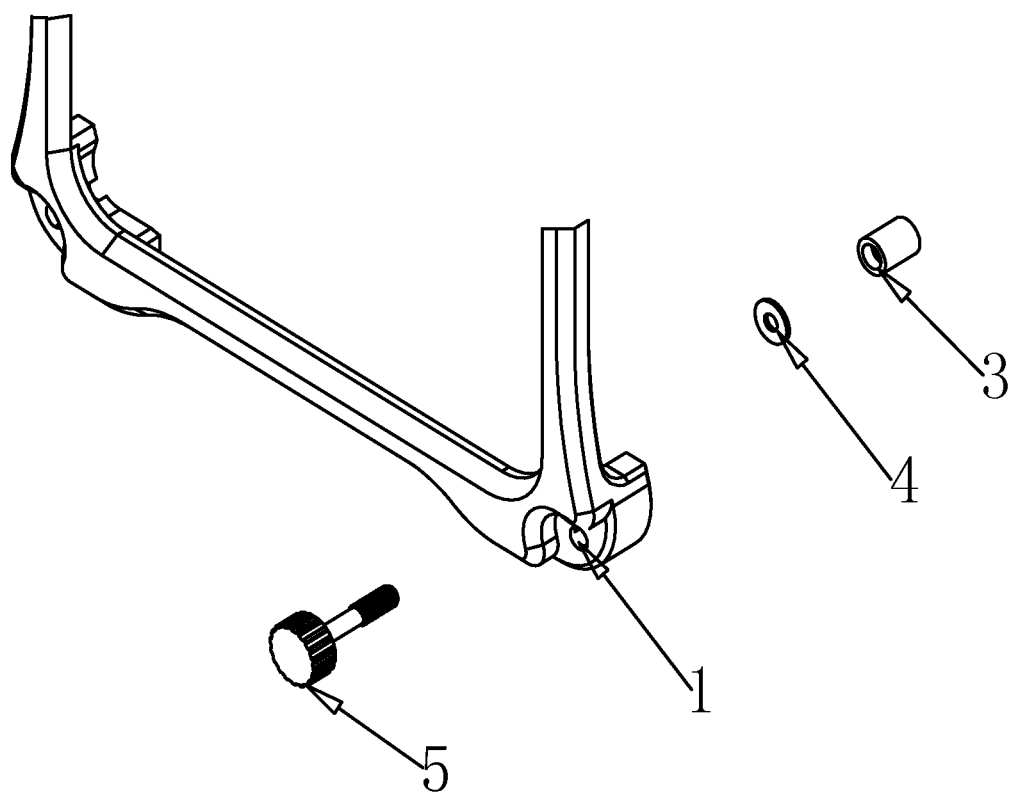
FIG. 1 is an exploded view of the improved screw fastener according to one embodiment of the invention.
Figure 2:
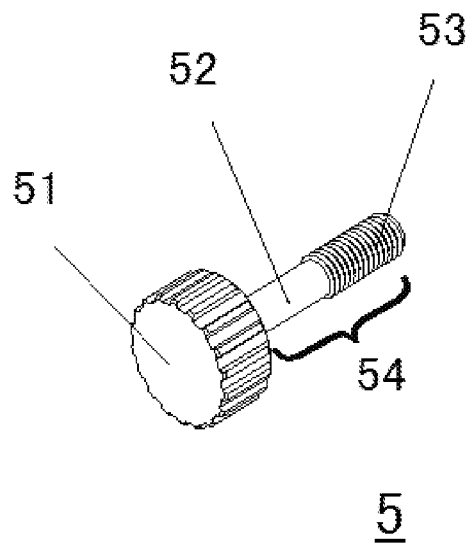
FIG. 2 is a perspective view of the screw according to one embodiment of the invention.
Figure 3:
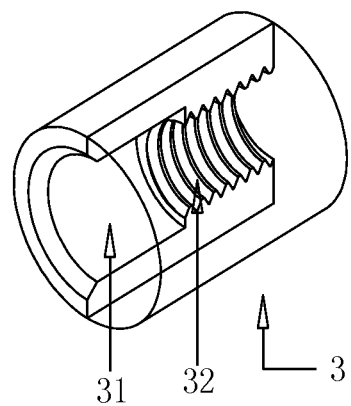
FIG. 3 is a perspective view of the nut according to one embodiment of the invention.
Figure 4:
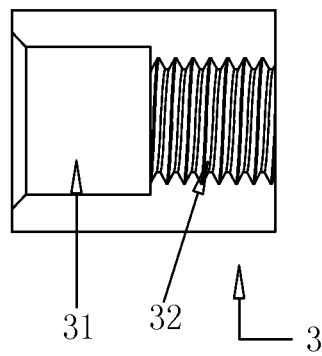
FIG. 4 illustrates the countersink bore section and threaded section of the nut.

The screw fastener in the invention is designed for attaching the workpiece, i.e. the part to be fastened, which is provided with a countersink bore and a threaded section to a fixed member.

Embodiments of the invention will now be described further in detail with reference to the drawings accompanied. In the embodiments, the fixed member is a nut 3. It shall be understood, however, that the invention is not limited by this choice.

An improved screw fastener is shown in FIGS. 1 to 4; the fastener is comprised of a screw 5 having a head 51 and a stem 54, a plastic washer 4, and a nut 3.

The plastic washer 4 can be made of PET (polyethylene terephthalate) film of a thickness of 0.2 mm and an outer diameter of 3.5 mm; in addition, the internal diameter of the plastic washer is 1.5 mm.

The screw 5 can be made of stainless steel. The head 51 can have a length of 2.5 mm and a diameter of 5.0 mm. Further, the circumference of the head can be provided with knurling, the knurling can be straight knurling, hatching knurling or tooth-shaped knurling. By means of the knurling, a user of the fastener can revolve in or revolve out the screw 5 from the nut 3 by hand without using any dedicated device, such as a screw driver, which makes the operation easier.

The stem 54 is provided with a first stem portion 52 abutting the head 51 and a second stem portion 53 abutting the first stem portion. The first stem portion 52 is preferably 4.9 mm in length and 1.4 mm in diameter; the second stem portion 53 is provided with threads.

The material of the nut 3 is preferably brass, the fixing hole of the nut, namely the center hole of the nut 3 comprising a front section 31 in the form of a countersink bore and a rear section 32 in the form of a threaded hole for engaging with the second threaded stem portion 53. The diameter of the countersink bore can be 1.9 mm and the length of the countersink bore can be 2.2 mm; the diameter of the threaded hole can be 1.7 mm which is smaller than the diameter of the countersink bore and the length of the threaded hole can be 1.8 mm. The external diameter of the plastic washer 4 shall be larger than the diameter of the countersink bore 31.

Figure 5A:
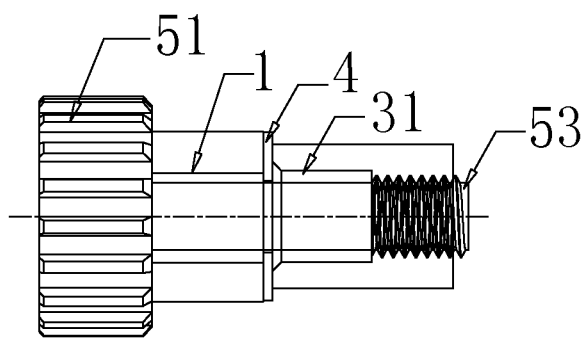
FIG. 5a illustrates the fastened state of the screw fastener.
Figure 5B:
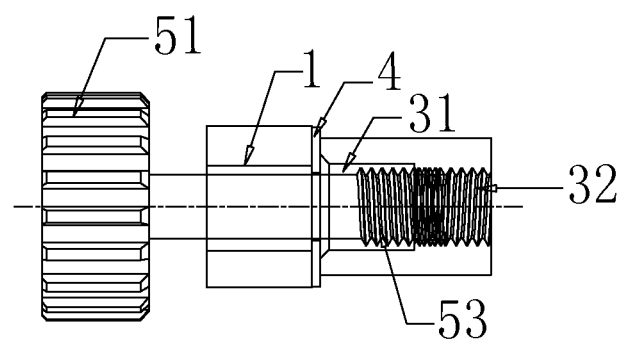
FIG. 5b illustrates a loose state of the screw fastener wherein the stem have yet completely detached from the threaded section.
Figure 5C:
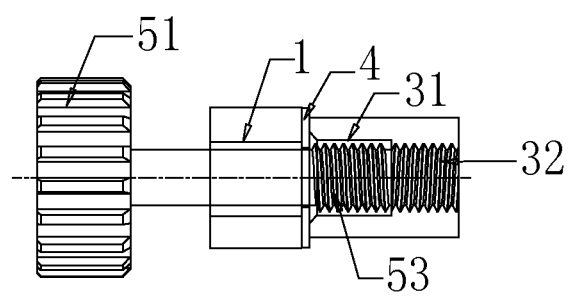
FIG. 5c illustrates a loose state of the screw fastener wherein the stem have completely detached from the threaded section.

As shown in FIGS. 5a to 5c, the fastening process of the fastener is firstly passing the stem 54 consecutively through the hole of the part to be fastened 1 and the plastic washer 4, after which the plastic washer can only move within the range of the first stem portion 52 as its internal diameter is smaller than the diameter of the threaded second stem portion 53. The nut 3 is then fitted to the second stem portion 53 by slipping the second stem portion through the countersink bore, i.e. the front section 31, and then revolving the nut 3 or the stem head so that the internal threads of the threaded rear section 32 engages with the threads on the second stem 53. After the part is fastened, the plastic washer is squeezed between the nut 3 and the part to be fastened 1 in a position on the first stem portion 52.

In case the part is to be released, the nut is firstly loosened by revolving the nut or the stem head 51 in the reverse direction so that the second stem portion is detached from the threaded hole 32 of the nut 3 during which however, the plastic washer 4 remains attached to the stem 54. As the second stem 53 is completely detached from the nut, the end of the second stem 53 enters into the countersink bore 31 of the nut, the plastic washer remains attached to the stem 54 of the screw. Also, since the internal diameter of the plastic washer is larger than the diameter of the hole of the part to be fastened, detachment of the screw from the nut will not result in detachment of the screw and the part to be fastened and thereby accidental dropping of the screw is avoided.

The countersink bore for the nut as mentioned is designed for addressing the problem with the prior art nut, with which the entire length is provided with threads, that the screw is revolved out only when the entire length of the threads of the nut have been detached during which the plastic washer 4 may be pushed to the free end of the stem and may drop as a result of a further movement of the screw 54. When the screw lacks constraint from the plastic washer, it may get lost at any time.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. An improved screw fastener for fastening a workpiece to a fixed member, comprising:
    a screw having a head and a stem, wherein the head is circumferentially provided with knurling and the stem is provided with a first stem portion abutting the head and a second stem portion abutting the first stem portion, the first stem portion being provided with a smooth surface whereas the second stem portion is provided with a threaded surface;
    a fixed member having a countersink bore section and a threaded bore section for engagement with the threaded surface of the second stem portion, wherein the countersink bore section has a first diameter that is larger than a second diameter of the threaded bore section; and
    a plastic washer having a hole with an inner diameter that allows the plastic washer to engage with the threaded surface of the second stem portion of the screw and an outer diameter that is larger than the first diameter of the countersink bore section of the fixed member;
    wherein the second stem portion passes sequentially through the workpiece to be fastened, the plastic washer, the countersink bore section and is engaged with the threaded bore section of the fixed member.

2. The improved screw fastener according to claim 1, wherein the knurling is straight knurling, hatching knurling, or tooth-shaped knurling.

3. The improved screw fastener according to claim 1, wherein the countersink bore section of the fixed member accommodates at least a part of the first stem portion of the screw when the threaded surface of the second stem portion of the screw is engaged with the threaded bore section of the fixed member, and
    wherein the countersink bore section of the fixed member accommodates at least a part of the threaded surface of the second stem portion of the screw when the threaded surface of the second stem portion of the screw is completely disengaged from the threaded bore section of the fixed member.

4. The improved screw fastener according to claim 1, wherein the countersink bore section of the fixed member accommodates the threaded surface of the second stem portion of the screw when the threaded surface of the second stem portion of the screw is completely disengaged from the threaded bore section of the fixed member.

5. The improved screw fastener according to claim 1, wherein the threaded surface of the second stem portion of the screw has a first length,
    wherein the countersink bore section of the fixed member has a second length, and
    wherein the second length is greater than the first length such that the countersink bore section of the fixed member accommodates the threaded surface of the second stem portion of the screw when the threaded surface of the second stem portion of the screw is completely disengaged from the threaded bore section of the fixed member.

6. A screw fastener for fastening a workpiece to a fixed member, comprising:
    a screw including a head and a stem, wherein the head includes knurling and the stem includes a first stem portion abutting the head and a second stem portion abutting the first stem portion, the first stem portion having a smooth surface and the second stem portion having a threaded surface;
    a fixed member including:
        a countersink bore section having a first diameter; and
        a threaded bore section for engagement with the threaded surface of the second stem portion, the threaded bore section having a second diameter,
        wherein the first diameter is greater than the second diameter, the countersink bore section abutting the threaded bore section, and the countersink bore section being located between the head of the screw and the threaded bore section; and
    a plastic washer having a opening with an inner diameter that is less than an outer diameter of the threaded surface of the second stem portion of the screw, the plastic washer having an outer diameter that is larger than the first diameter of the countersink bore section of the fixed member, the plastic washer being disposed between the head of the screw and the threaded bore section;
    wherein, in an assembled state, a portion of the first stem portion extends through a bore in the workpiece and the opening in the plastic washer and into the countersink bore section of the fixed member, and the threaded surface of the second stem portion is engaged with the threaded bore section of the fixed member.

7. The screw fastener of claim 6, wherein the threaded surface of the second stem portion of the screw has a first length,
    wherein the countersink bore section of the fixed member has a second length, and
    wherein the second length is greater than the first length such that the countersink bore section of the fixed member accommodates the threaded surface of the second stem portion of the screw when the threaded surface of the second stem portion of the screw is completely disengaged from the threaded bore section of the fixed member.

* * * * *